US012388643B2

(12) United States Patent
Huo et al.

(10) Patent No.: US 12,388,643 B2
(45) Date of Patent: Aug. 12, 2025

(54) AUTHORIZATION MANAGEMENT IN AN INTERNET OF THINGS (IoT) NETWORK

(71) Applicant: International Business Machines Corporation, Armonk, NY (US)

(72) Inventors: Qi Feng Huo, Haidian District (CN); Xiang Dong Hu, Beijing (CN); Yan Lin Ren, Shanghai (CN); Hong Qing Zhou, Shanghai (CN); Peng Hui Jiang, Beijing (CN); Ling Ling Sh Hu, ShangHai (CN); Zhang Li, Hai Dian district (CN)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 17/650,087

(22) Filed: Feb. 7, 2022

(65) Prior Publication Data

US 2023/0254147 A1   Aug. 10, 2023

(51) Int. Cl.
*H04L 9/32* (2006.01)
*H04L 9/00* (2022.01)
*H04L 9/40* (2022.01)

(52) U.S. Cl.
CPC .......... *H04L 9/3213* (2013.01); *H04L 9/3239* (2013.01); *H04L 63/10* (2013.01); *H04L 9/50* (2022.05)

(58) Field of Classification Search
CPC ....... H04L 9/3213; H04L 9/3239; H04L 9/50; H04L 63/10
USPC ....................................................... 713/159
See application file for complete search history.

(56) References Cited

U.S. PATENT DOCUMENTS

| 9,633,197 | B2 | 4/2017 | Lakshmanan | |
| 10,505,726 | B1 | 12/2019 | Andon | |
| 10,924,466 | B2* | 2/2021 | Biyani | G06F 21/64 |
| 11,025,626 | B1 | 6/2021 | Todd | |
| 11,075,891 | B1 | 7/2021 | Long | |
| 11,138,608 | B2* | 10/2021 | Green | H04L 9/0643 |
| 11,296,937 | B2* | 4/2022 | Nolan | H04W 84/22 |
| 11,507,698 | B2* | 11/2022 | Sohail | H04W 12/122 |

(Continued)

FOREIGN PATENT DOCUMENTS

| IN | 202111022945 A | 5/2021 |
| JP | 6829927 B1 | 3/2022 |
| WO | 2017095036 A1 | 6/2017 |

OTHER PUBLICATIONS

"Non-fungible tokens (NFT)", Printed Dec. 22, 2021, 23 pages, <https://ethereum.org/zh/nft/>.

(Continued)

*Primary Examiner* — Amare F Tabor
(74) *Attorney, Agent, or Firm* — Edward J. Wixted, III

(57) ABSTRACT

In an approach, a processor receives, at an edge node, a message from an IoT device associated with the edge node, the message being embedded with at least one non-fungible token (NFT) and each of the at least one NFT representing a corresponding authorization associated with the IoT device. A processor retrieves, at the edge node, the at least one NFT from the received message. A processor validates, at the edge node, the received message based on the retrieved at least one NFT. A processor, responsive to validating the received message, forwards, by the edge node, the received message to a center node associated with the edge node.

17 Claims, 6 Drawing Sheets

(56) References Cited

U.S. PATENT DOCUMENTS

| | | | | |
|---|---|---|---|---|
| 11,729,004 | B2* | 8/2023 | Panchamia | H04L 9/3215 |
| | | | | 713/176 |
| 12,014,363 | B2* | 6/2024 | Haddad | G06Q 20/38215 |
| 12,093,934 | B2* | 9/2024 | Kurian | H04L 9/3213 |
| 2017/0264597 | A1* | 9/2017 | Pizot | H04L 67/02 |
| 2017/0279682 | A1* | 9/2017 | Dawson | H04L 41/0893 |
| 2019/0036906 | A1 | 1/2019 | Biyani | |
| 2020/0314648 | A1* | 10/2020 | Cao | H04L 9/0637 |
| 2021/0367775 | A1* | 11/2021 | Grau | G16Y 30/10 |
| 2022/0292343 | A1* | 9/2022 | Manuel-Devadoss | |
| | | | | H04L 67/125 |
| 2022/0393883 | A1* | 12/2022 | Panchamia | G06Q 20/38215 |

OTHER PUBLICATIONS

"Project-chip /connectedhomeip", Github, Printed Dec. 22, 2021, 12 pages. <https://github.com/project-chip/connectedhomeip>.

Arcenegui et al., "Secure Combination of IoT and Blockchain by Physically Binding IoT Devices to Smart Non-Fungible Tokens Using PUFs", Sensors 2021, 21, 3119, <https://www.mdpi.com/1424-8220/21/9/3119/htm>.

Asanghanwa et al., "Security for Intelligent, Connected IoT Edge Nodes", Atmel, 2015, <http://ww1.microchip.com/downloads/en/DeviceDoc/Atmel-8994-Security-for-Intelligent-Connected-IoT-Edge-Nodes_Whitepaper.pdf>.

Entriken et al., "EIP-721: Non-Fungible Token Standard," Ethereum Improvement Proposals, No. 721, Jan. 2018. [Online serial], 15 pages, <https://eips.ethereum.org/EIPS/eip-721>.

Lau et al., "Blockchain-based Authentication in IoT Networks", IEEE, Dec. 13, 2018, 8 pages, <https://ieeexplore.ieee.org/document/8625141>.

Li, Shancang, "IoT Node Authentication", Securing the Internet of Things—Chapter 4, Elsevier, 2017, 27 pages, <https://cdn.ttgtmedia.com/rms/IoTAgenda/Securing-the-Internet-of-Things-ch4.pdf>.

Mell et al., "The NIST Definition of Cloud Computing", National Institute of Standards and Technology, Special Publication 800-145, Sep. 2011, 7 pages.

Omar et al., "Capability-Based Non-fungible Tokens Approach for a Decentralized AAA Framework in IoT", Research gate, Mar. 2020, 24 pages, <https://www.researchgate.net/publication/339621498_Capability-Based_Non-fungible_Tokens_Approach_for_a_Decentralized_AAA_Framework_in_IoT>.

Omar, Ahmad Sghaier, "Decentralized Identity and Access Management Framework for Internet of Things Devices", A thesis presented to the University of Waterloo in fulfillment of the thesis requirement for the degree of Doctor of Philosophy in Electrical and Computer Engineering, Waterloo, Ontario, Canada, 2020, 199 pages, <https://uwspace.uwaterloo.ca/bitstream/handle/10012/15979/SghaierOmar_Ahmad.pdf>.

International Searching Authority, "Notification of Transmittal of the International Search Report and the Written Opinion of the International Searching Authority, or the Declaration", International application No. PCT/EP2023/052819, International Filing Date Feb. 6, 2023, Mailed on May 10, 2023, 9 pages.

* cited by examiner

AUTHORIZATION MANAGEMENT IN AN INTERNET OF THINGS (IoT) NETWORK

BACKGROUND

The present invention relates to Internet of Things (IoT), and more specifically, to authorization management in an IoT network.

The Internet of Things (IoT) is a network of physical objects that connect and exchange data with other devices and systems over the Internet or other communication networks. Such physical objects may typically be referred to as IoT devices which may include a wide range of devices that are pieces of hardware, such as sensors, actuators, gadgets, appliances, or machines, programmed for certain applications and can transmit data over the Internet or other communication networks. The IoT may provide rich data, however it also induces a lot of security concerns due to the wide variety of IoT devices that are not secure. For example, a hacked thermometer device may report humidity data that may lead to an unwanted action.

There are strong needs for an enhanced authorization management in an IoT network.

SUMMARY

In one or more embodiments described herein, devices, systems, computer-implemented methods, apparatus and/or computer program products for data recovery are described.

In an example embodiment, a computer-implemented method for device authorization management in an Internet of Things (IoT) network is provided. The IoT network comprising a plurality of edge nodes and a plurality of center nodes, the method comprises receiving, at an edge node, a message from an IoT device associated with the edge node, the message being embedded with at least one non-fungible token (NFT) and each of the at least one NFT representing a corresponding authorization associated with the IoT device. The method further comprises retrieving, at the edge node, the at least one NFT from the received message. The method further comprises validating, at the edge node, the received message based on the retrieved at least one NFT and forwarding, by the edge node, responsive to the validation indicating the received message conforming the corresponding authorization of the retrieved at least one NFT, the received message to a center node associated with the edge node. Such an approach provides an advantage of enhancing security to authorize an edge node.

In another example embodiment, a computer-implemented system for device authorization management in an Internet of Things (IoT) network is also provided. The IoT network comprising a plurality of edge nodes and a plurality of center nodes, the system comprises a processor, and a memory medium, coupled to the processor and comprising program instructions. The program instructions comprise program instructions configured to receive, at an edge node, a message from an IoT device associated with the edge node, the message being embedded with at least one non-fungible token (NFT) and each of the at least one NFT representing a corresponding authorization associated with the IoT device. The program instructions further comprise program instructions configured to retrieve, at the edge node, the at least one NFT from the received message. The program instructions further comprise program instructions configured to validate, at the edge node, the received message based on the retrieved at least one NFT and program instructions configured to forward, by the edge node, responsive to the validation indicating the received message conforming the corresponding authorization of the retrieved at least one NFT, the received message to a center node associated with the edge node. Such an approach provides an advantage of enhancing security to authorize an edge node.

In other example embodiments, corresponding computer program products are also provided. The IoT network comprising a plurality of edge nodes and a plurality of center nodes, the system comprises a processor, and a memory medium, coupled to the processor and comprising program instructions. The program instructions comprise program instructions configured to receive, at an edge node, a message from an IoT device associated with the edge node, the message being embedded with at least one non-fungible token (NFT) and each of the at least one NFT representing a corresponding authorization associated with the IoT device. The program instructions further comprise program instructions configured to retrieve, at the edge node, the at least one NFT from the received message. The program instructions further comprise program instructions configured to validate, at the edge node, the received message based on the retrieved at least one NFT and program instructions configured to forward, by the edge node, responsive to the validation indicating the received message conforming the corresponding authorization of the retrieved at least one NFT, the received message to a center node associated with the edge node. Such an approach provides an advantage of enhancing security to authorize an edge node.

DETAILED DESCRIPTION

Figure 1:
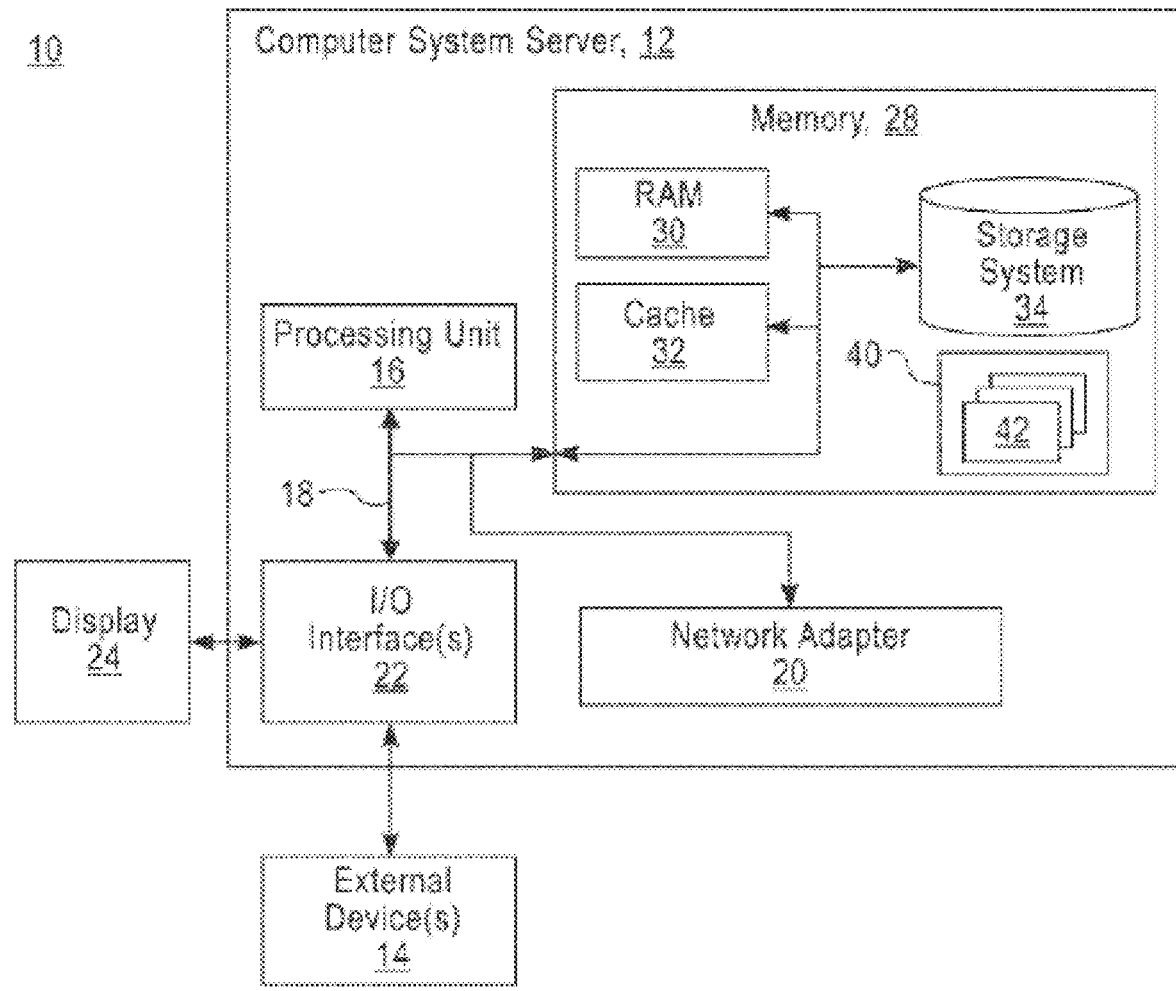
FIG. 1 depicts a cloud computing node according to an embodiment of the present invention.

The following detailed description is merely illustrative and is not intended to limit embodiments and/or application or uses of embodiments.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments of the present disclosure may be implemented with, however not limited to, a cloud computing environment which will be described in the following.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
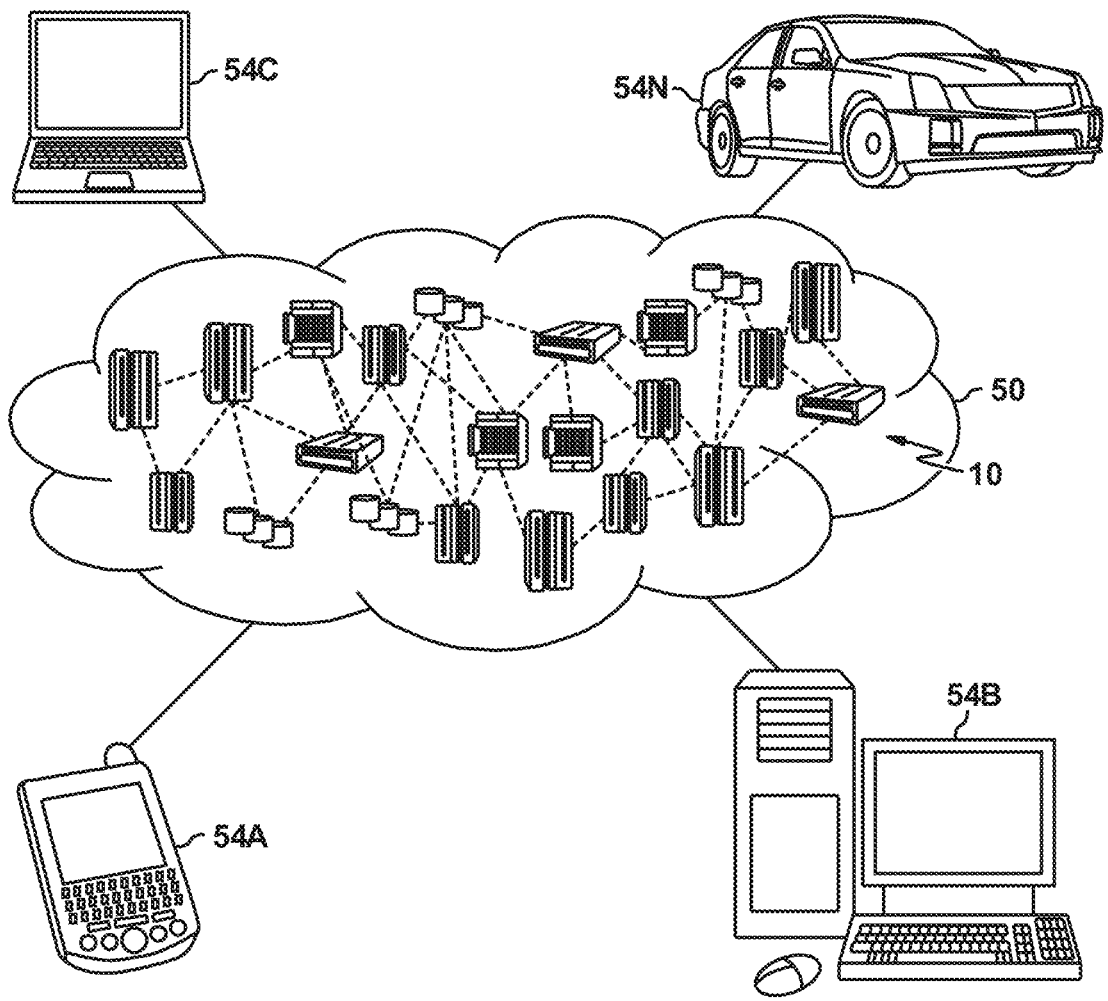
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
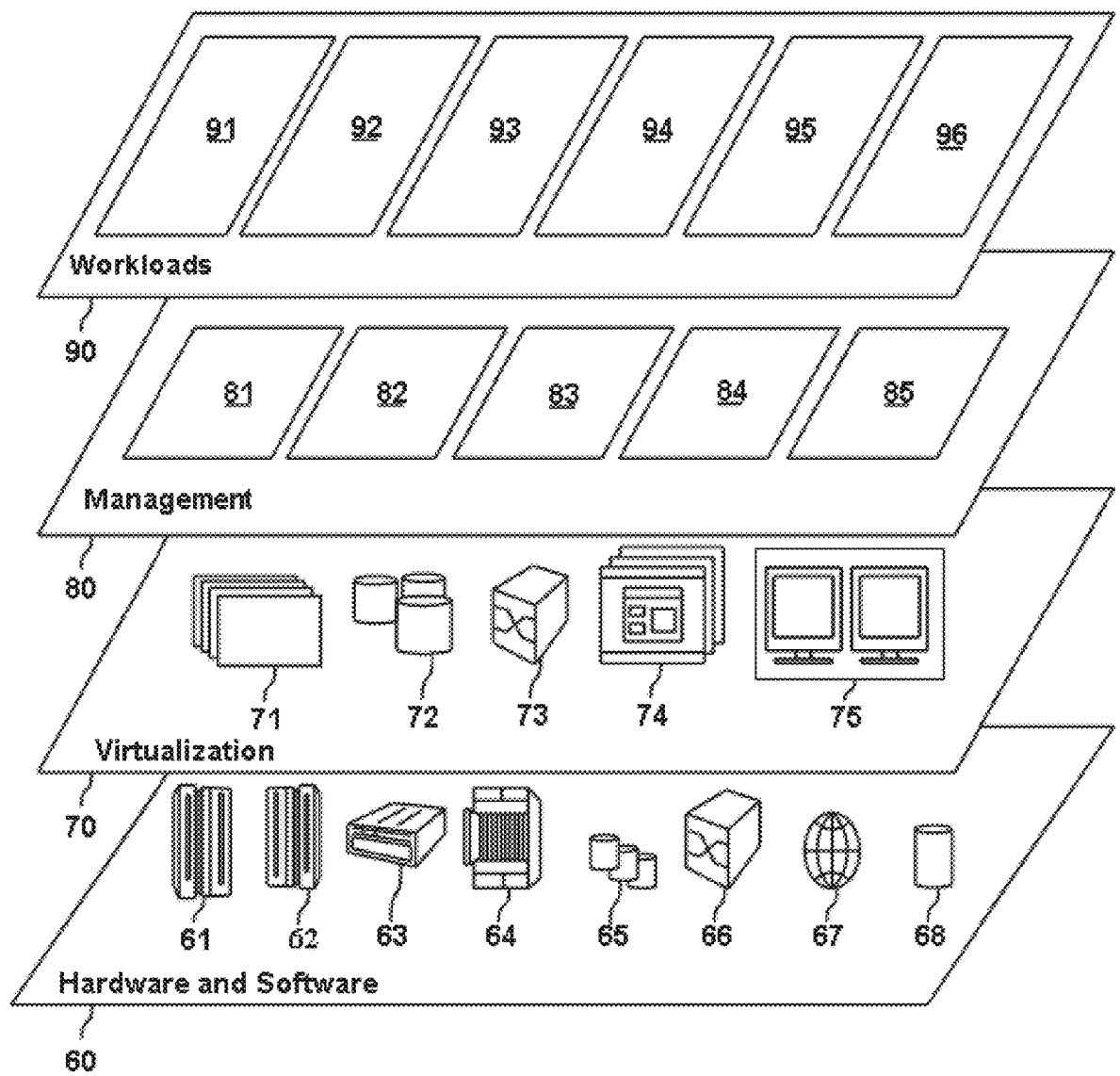
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and authorization management 96.

Internet of Things (IoT) may induce a lot of security concerns due to the wide variety of IoT devices that are not secure. To tackle the security concerns, several approaches are developed in existing arts. One such approach includes a distributed one-way authentication where an IoT device authenticates itself to another device, typically an edge node (or a gateway) that the IoT device is associated with, while the other device does not need to authenticate the IoT device (or vice versa). The one-way approach simplifies the authentication process and is not secure enough. Another approach is a distributed two-way authentication which enhances the distributed one-way authentication by enforcing the IoT device and the other device to mutual authenticate each other, typically via a Transport Layer Security (TLS) protocol. A further enhancement to the distributed two-way authentication is a centralized three-way authentication, in which a central authority that is associated with and trusted by both the IoT device and the other device carries out the authentication of both the IoT device and the other device.

However, none of the above approaches address the security concerns where a hacked thermometer device may report humidity data that may lead to an unwanted action. This is because an IoT device hacked can still authenticate itself with its valid authentication information in existing approaches, and therefore can still send malicious data (e.g., humidity data sent by a hacked thermometer device that may trigger an unwanted action) after authentication. Therefore, an enhanced authorization management in an IoT network is needed.

Embodiments in the present disclosure provide an enhanced authorization management in an IoT network in which a unique authorization may be associated with a corresponding resource that an IoT device is authorized to provide, such that for each resource an IoT device is authorized to provide, a corresponding unique authorization may be assigned. Such configuration may provide capabilities to validate resources provided by the IoT device. If a resource provided by an IoT device cannot be validated, i.e., there is no corresponding authorization associated with the resource, the resource will be deemed as invalid. Such fine-grained authorization ensures that only authorized resources can be provided by an IoT device.

In order to provide such capabilities stated out in the above, embodiments in the present disclosure adopt a mechanism called a non-fungible token (NFT) in which a resource that an IoT device is authorized to provide may be associated with a corresponding unique authorization implemented as an NFT, such that each resource an IoT device is authorized to provide may be associated with a unique NFT. Whenever an IoT device tries to send out data related a resource, the unique NFT associated with the resource may be embedded in the data such that the party receiving the data may validate the received data based on the unique NFT to ensure that only the data of authorized resources from the IoT device (i.e., the data validated by the receiving party using the unique NFT) can be accepted.

An NFT, according to embodiments in the present disclosure, is a token that can represent the ownership of a resource that an IoT device is authorized to provide. For example, if an IoT device is authorized to provide temperature and humidity, an NFT corresponding to temperate of the IoT device and another NFT corresponding to humidity of the IoT device may be correspondingly assigned. The purpose of the NFTs is to uniquely identify authorization in an IoT network, i.e., for each resource authorized in the IoT network, a corresponding NFT is assigned. In another word, even if two IoT devices may respectively be authorized to provide temperature, different NFTs should be assigned to corresponding temperatures provided by the two IoT devices.

The concept of NFTs is developed with the development of blockchain technology. A blockchain is a growing list of records, called blocks, that are linked together using cryptography. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. A blockchain is essentially a digital ledger of transactions that is duplicated and distributed across the entire network of computer systems on the blockchain. Each block in the chain contains a number of transactions, and every time a new transaction occurs on the blockchain, a record of that transaction is added to every participant's ledger. The decentralized database managed by multiple participants is known as Distributed Ledger Technology (DLT).

In a word, a blockchain is a decentralized, distributed, and oftentimes public, digital ledger consisting of records called blocks that is used to record transactions across many computers so that any involved block cannot be altered retroactively, without the alteration of all subsequent blocks. This allows the participants to verify and audit transactions independently and relatively inexpensively. A blockchain database is managed autonomously using a peer-to-peer network and a distributed timestamping server. They are authenticated by mass collaboration powered by collective self-interests. Such a design facilitates robust workflow where participants' uncertainty regarding data security is marginal. The use of a blockchain removes the characteristic of infinite reproducibility from a digital asset. It confirms that each unit of value was transferred only once, solving the long-standing problem of double spending. A blockchain has been described as a value-exchange protocol. A blockchain can maintain title rights because, when properly set up to detail the exchange agreement, it provides a record that compels offer and acceptance.

An NFT is a unique and non-interchangeable unit of data stored on a digital ledger and was originally developed to represent ownership of unique items. For example, an NFT can be associated with easily reproducible items such as photos, videos, audio, and other types of digital files as unique items (analogous to a certificate of authenticity) and uses blockchain technology to give the NFT a public proof of ownership. With NFTs, the ownership for each of such easily reproducible items can be uniquely identified. Embodiments of the invention borrows the concept of the NFT, in which each NFT can uniquely represent an authorized resource in an IoT network, i.e., for each resource authorized in the IoT network, a corresponding NFT is assigned. In another word, two authorized resources of the same type provided by two different IoT devices will be assigned with different NFTs.

Given the characteristics of blockchain technology—immutability, decentralized, enhanced security, distributed ledgers, consensus, etc.—the NFT mechanism, which is based on blockchain technology, inherits all these characteristics mentioned above, and further provides capabilities of ownership certification with all these characteristics embedded, and therefore is beneficial to embodiments in the present disclosure which will now be described in connection with FIGS. 4 to 6.

Figure 4:
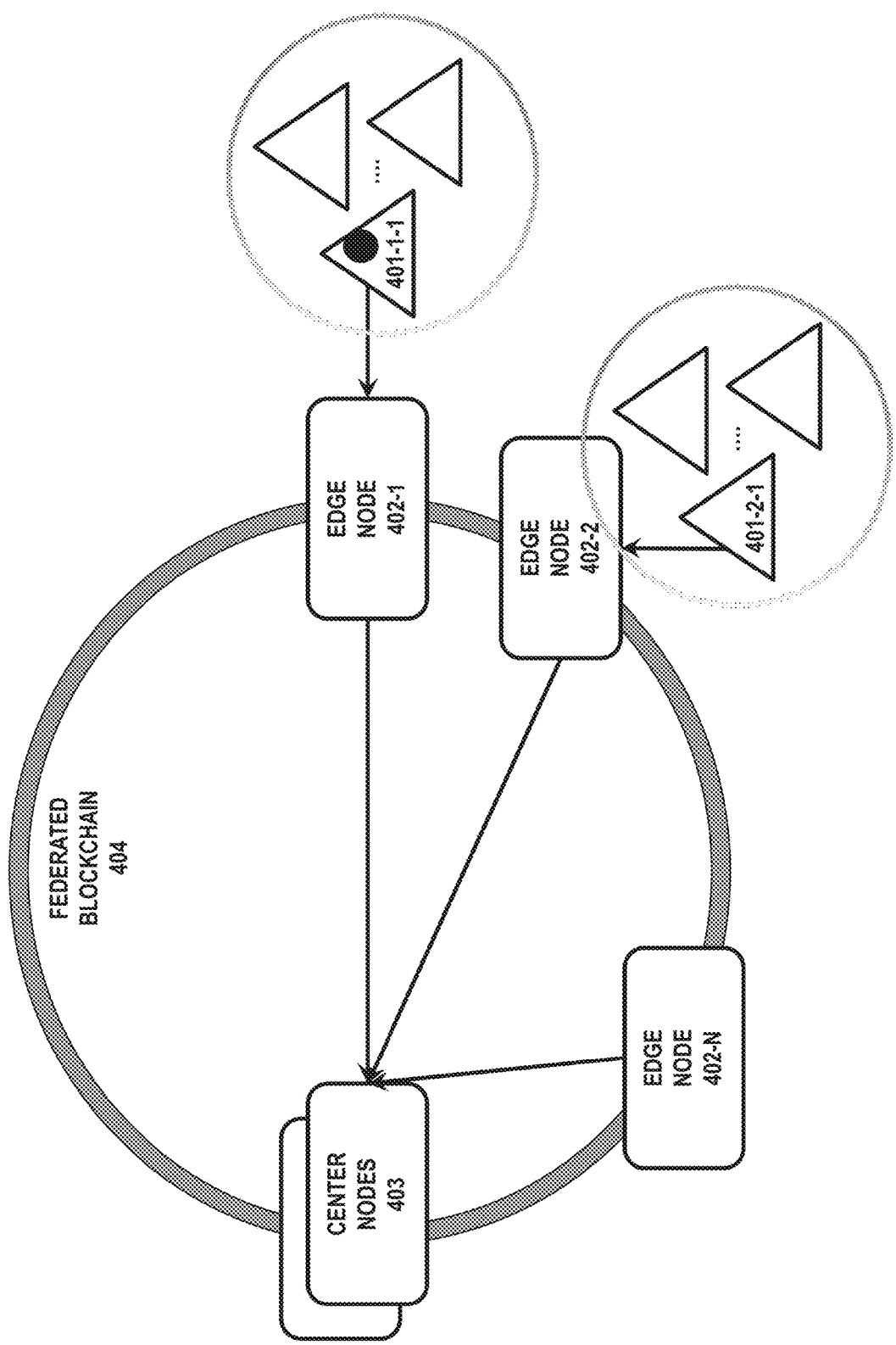
FIG. 4 depicts a system architecture according to an embodiment of the present invention.

Referring now to FIG. 4, which depicts an example system architecture according to some embodiments in the present disclosure. The example system architecture may be an example IoT network with a plurality of IoT devices 401-1-1, . . . , 401-2-1, . . . , 402-N-1 (not shown), . . . , being respectively associated with a plurality of edge nodes 402-1, 402-2, . . . , 402-N. The plurality of edge nodes 402-1, 402-2, . . . , 402-N may be associated with a plurality of center nodes 403. The plurality of edge nodes 402-1, 402-2, . . . , 402-N may respectively receive resource related data (e.g., measurements from sensors of the plurality of IoT devices) from associated IoT devices 401-1-1, . . . , 401-2-1, . . . , 402-N-1 (not shown), . . . , and forward the received resource related data to one of the plurality of center nodes 403, which may further pass on the received resource related data to upper layer applications, for executing certain actions based on the received measurements.

According to some embodiments in the present disclosure, the plurality of edge nodes 402-1, 402-2, . . . , 402-N and the plurality of center nodes 403 may build a federated blockchain 404 and an IoT device may register itself with the blockchain through blockchain transactions. An IoT device may register itself using its device identifier, e.g., an associated Universally Unique Identifier (UUID) that uniquely identifies itself.

Upon registration, an IoT device may also register a list of resources it is authorized to provide (authorized resources), identified by a list of corresponding resource identifiers. According to some embodiments in the present disclosure, a plurality of corresponding NFTs may be created for a plurality of resources authorized in the IoT network, e.g., by a resource manager that manages authorizations in the IoT network, which is shown in FIG. 5 and will be described later. With the NFT mechanism proposed in the present disclosure, each authorized resource may be assigned with a corresponding unique NFT such that two authorized resources of the same type provided by two different IoT devices will be assigned with different NFTs.

According to some embodiments in the present disclosure, whenever an IoT device registers itself with the IoT network, e.g., by associating itself with an edge node, the IoT device may register the IoT device using its device identifier, the resources the IoT device is authorized to provide, by submitting one or more transactions to the federated blockchain. Corresponding NFTs may then be assigned to the resources the IoT device is authorized to provide by submitting corresponding transactions to the federated blockchain, e.g., also via the resource manager shown in FIG. 5. The registration of the IoT device is finalized after the submitted transactions of registering the IoT device and the transactions of assigning the corresponding NFTs to the resources have been validated through a consensus. After registration, the IoT device may be set as the owner of the assigned NFTs, which may be stored as a smart contract on the blockchain. According to some embodiments in the present disclosure, all IoT devices associated with the IoT network will need to go through the above-discussed registration process, such that a unique NFT may be assigned to each of the authorized resources in the IoT network.

Whenever a registered IoT device tries to send out data related a resource, it may be checked whether there is a corresponding NFT assigned to the resource and if yes, the corresponding NFT may be embedded in the data. An edge node receiving the data may extract the NFT and validate the received data based on the extracted NFT. If, however, it is found out that there is no corresponding NFT assigned to the resource, e.g., the IoT device has been hacked after registration and started send out data related to an un-authorized resource (a hacked thermometer sends out humidity data, as discussed above) the IoT device may still send out the data without such NFT embedded. As aforementioned, after registration, all authorized resources have been assigned with respective NFTs, a resource without NFT assigned will be deemed un-authorized and data related to the un-authorized resource cannot be validated as no NFT can be extracted from the data.

According to some embodiments of the present disclosure, after a successfully registration of an IoT device, a module configured to receive and store corresponding assigned NFTs can be injected to the IoT device. The module may also be configured to enforce the registered IoT device to check NFTs before sending out any data related to a resource. The module may also be configured to embed a corresponding NFT to data related to an authorized resource. According to some embodiments of the present disclosure, the module may be a sandbox program run in the operating system of the IoT device injected, e.g., through Extended Berkeley Packet Filter (eBPF) technology after the IoT device has been successfully registered with the IoT network.

According to some embodiments in the present disclosure, instead of injecting the module mentioned above, the receiving and storing of corresponding assigned NFTs may utilize a Trusted Platform Module (TPM) of the registered IoT device, if there is one. The TPM may be further configured to check NFTs before sending out any data related to a resource and embed a corresponding NFT to data related to an authorized resource.

The utilization of the injected module or the TPM ensures that an NFT can only be read from the injected module or the TPM and no one can modify it once it is stored within.

It should be pointed out, once the registration of an IoT device has completed, no further registration-like process for the same IoT device can be accepted. This ensures that the registration for an IoT device can happen only once. If a cloned IoT device tries to register itself with the IoT network, it will be rejected. The registration may utilize the one-way authentication, two-way authentication, or centralized three-way authentication mentioned above, where the difference lies in that a corresponding NFT for each authorized resource in the IoT network is created and assigned.

Figure 5:
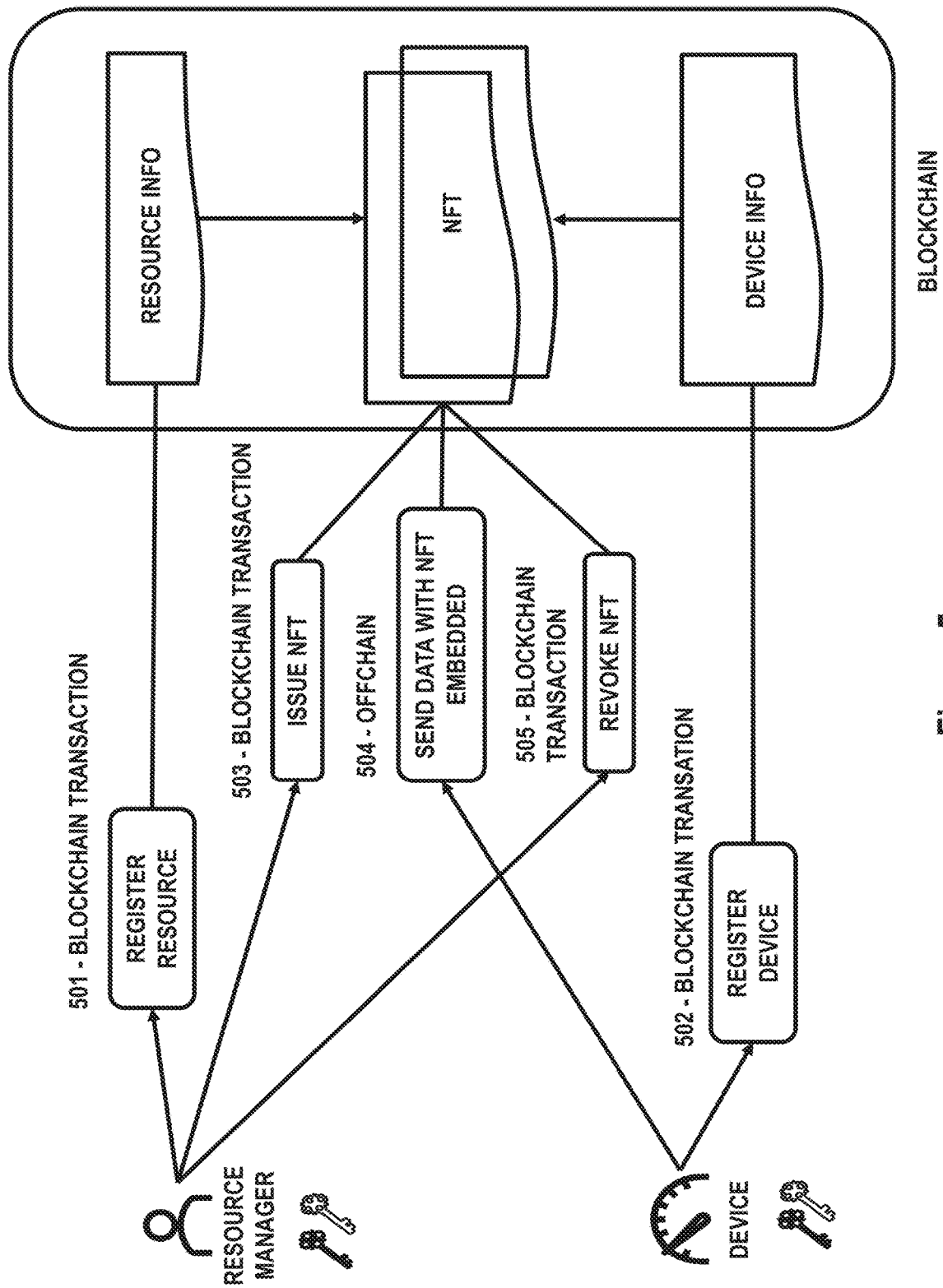
FIG. 5 depicts a flow of the system of FIG. 4 according to an embodiment of the present invention.

Now turning to FIG. 5, which depicts an example flow of the example system of FIG. 4 according to some embodiments in the present disclosure. The example flow shown in FIG. 5 depicts related blockchain transactions for NFTs according to some embodiments in the present disclosure. In FIG. 5, a resource manager configured to manage authorizations in the IoT network is shown. The resource manager may distributedly reside in the plurality of center nodes 403 of FIG. 4. The device shown in FIG. 5 may be any IoT device 401-1-1, . . . , 401-2-1, . . . , shown in FIG. 4. The blockchain shown in FIG. 5 corresponds to the federated blockchain 404 shown in FIG. 4. FIG. 5 depicts an overall process with regards to NFT related transactions of the example system of FIG. 4.

As discussed above, an IoT device may register a list of resources the IoT device is authorized to provide during the IoT device's registration phase. The list of authorized resources may be identified by corresponding resource identifiers. According to some embodiments of the present disclosure, the resource identifiers may be managed by the resource manager and be universal across the IoT network, i.e., resources with the same type can be associated with the same resource identifier (e.g., temperature provided by different IoT devices may be associated with a same resource identifier indicating the resource is temperature), while resources with different types may be associated with different resource identifiers (e.g., temperature can be associated with a resource identifier indicating the resource is temperature while humidity can be associated with another different resource identifier indicating the resource is humidity).

As shown in FIG. 5, the resource manager of the IoT network may register the list of resources via blockchain transactions with the blockchain (the federated blockchain 404), e.g., using corresponding resource identifiers, shown as the blockchain transaction 501 in FIG. 5. As discussed in the above, as the resource identifiers may be universal across the IoT network, the number of types of resources registered by the resource manager may be a finite number. This can enable a better management of resources compared with the approach where each authorized resource provided by each IoT device in the IoT network is associated with a unique resource identifier due to the fact that there may be thousands of IoT devices in the IoT network. Such approach can also reduce the complexity of the blockchain.

Also as shown in FIG. 5, a device may register itself via a blockchain transaction with the blockchain (the federated blockchain 404), e.g., using its device identifier, shown as the blockchain transaction 502 in FIG. 5. According to some embodiments in the present disclosure, the device identifier of the IoT device may be a universally unique identifier (UUID). The UUID of the IoT device may be assigned by the IoT network upon registration of the device and stored in a module injected to the device, or alternative, a TPM of the device.

The resource manager may also be configured to create, for each authorized resource provided by a device, a corresponding NFT to uniquely represent the corresponding authorization associated with the device. For example, if a device is authorized to provide temperature and humidity, an NFT corresponding to the temperature the device provides and an NFT corresponding to the humidity the device provides may be generated respectively. For each authorized resource in the IoT network, a corresponding NFT may be created which means two corresponding NFTs will be created for two resources with the same type but provided by two different devices.

There are various ways to create corresponding NFTs for authorized resources in the IoT network. According to some embodiments in the present disclosure, an NFT may be created using a pre-defined algorithm and a mapping between the created NFTs and authorized resources in the IoT network (i.e., the mapping between a resource an IoT device is authorized to provide and corresponding created NFT) may be stored. According to some embodiments in the disclosure, an NFT may be created using i) a device identifier of the device, e.g., the UUID assigned to the device by the IoT network, and ii) a resource identifier of the resource, e.g., the resource identifier for temperature. A combination of a device identifier and a resource identifier can uniquely identify what resource is received from which device, therefore there is no need to store the mapping between the created NFTs and authorized resources in the IoT network. FIG. 5 shows, as an example illustration, such approach with NFTs created using a combination of resource identifier (resource info) and device identifier (device info).

During registration and after corresponding NFTs have been created for respective resources the device is authorized to provide, the resource manager may issue the corresponding NFTs via blockchain transactions, shown as blockchain transaction 503 in FIG. 5. The issued NFTs may further be stored in a module injected to the device, or alternative, a TPM of the device. The issuance of NFTs may be stored on the blockchain as they are also blockchain transactions.

After a successful registration of the device, for each of the resources the device is authorized to provide, a corresponding NFT may be received from the IoT network, and stored in a module injected to the device, or alternative, a TPM of the device. Whenever the device tries to send out data related to a resource, it may be checked whether there is a corresponding NFT assigned to the resource, e.g., by the injected module or the TPM of the device. Responsive to the check indicates that there is a corresponding NFT assigned to the resource, the corresponding NFT may be embedded in the data. According to some embodiments in the present disclosure, the corresponding NFT may be embedded in a packet header of the layer-3 data packet, e.g., a preserved field of the Transport Control Protocol (TCP) packet header, or of the User Data Protocol (UDP) packet header. The specifications of TCP/UDP provide such capabilities. To further enhance security, the corresponding NFT may be firstly encoded using a base64 encoding scheme before being embedded to the preserved field, such that the corresponding NFT may not be obtained even if the contents of the preserved field are extracted.

According to some embodiments in the present disclosure, with the help of TPM, data with an NFT embedded may further be signed using a private key stored in the TPM before being sent to the IoT network to further enhance security. A party receiving the data may decrypt the data using a public key to extract the embedded NFT.

As shown in FIG. 5, the sending of data with NFTs embedded is not a blockchain transaction, shown as offchain 504 in FIG. 5.

According to some embodiments in the present disclosure, responsive to a de-registration of a device, the corresponding NFTs, created for the resources the device is authorized to provide, may be revoked via blockchain transactions, shown as blockchain transaction 505 in FIG. 5. According to some embodiments of the present disclosure, when the device registers itself again with the IoT network, the same device identifier and the same resource identifier may be associated with the device and may again be registered with the blockchain via blockchain transactions.

Figure 6:
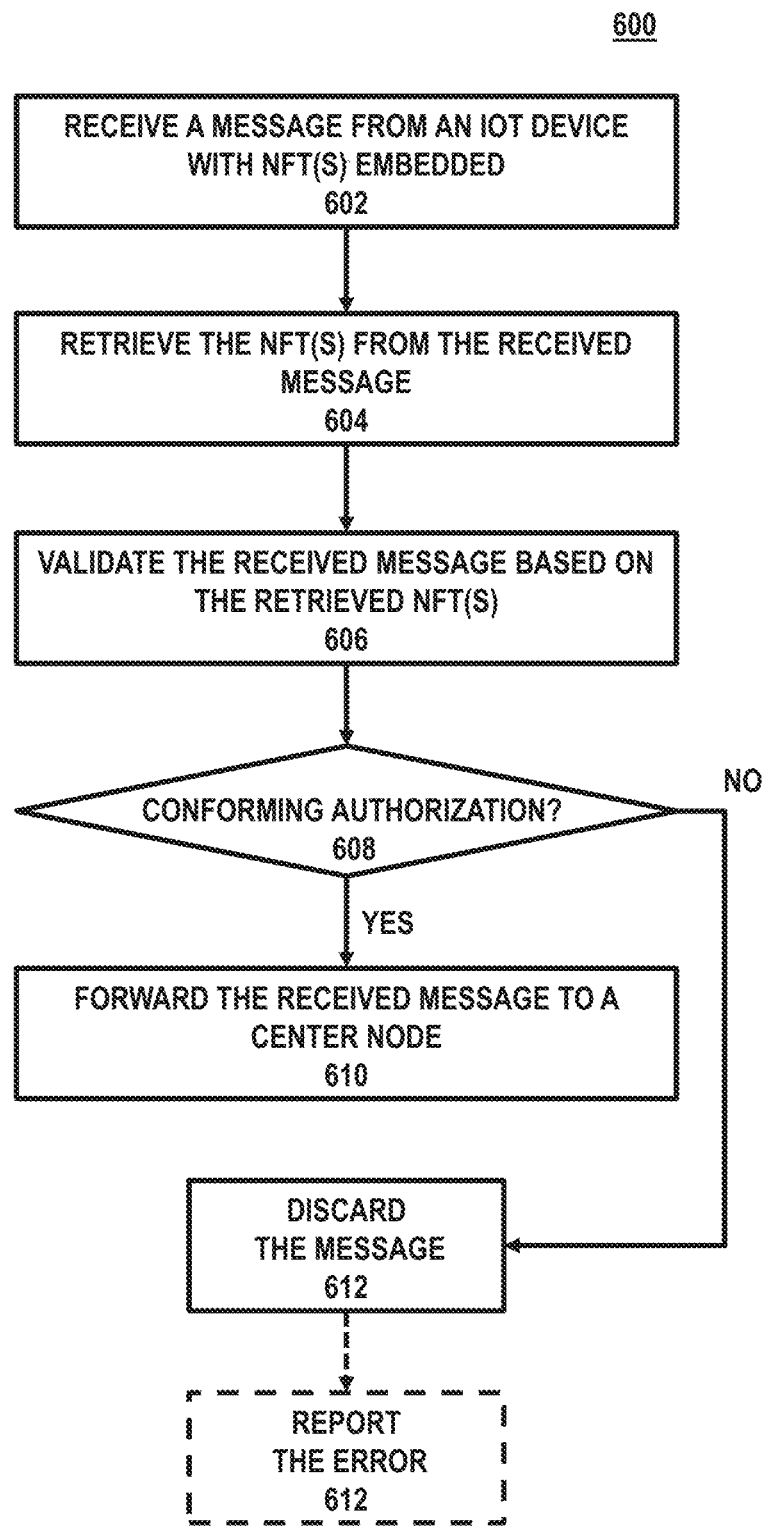
FIG. 6 depicts a flowchart according to an embodiment of the present invention.

Now referring to FIG. 6, which depicts an example flow diagram according to some embodiments in the present disclosure. The example flow shown in FIG. 6 depicts an example approach 600 of a device authorization management process in an IoT network according to some embodiments in the present disclosure. The example approach of device authorization management may be implemented, e.g., on an edge node of the plurality of edge nodes 402-1, 402-2, . . . , 402-N in FIG. 4.

The example approach 600 of device authorization management in an IoT network may start with step 602, in which the authorization management process receives a message at an edge node from an IoT device associated with the edge node. According to some embodiments in the present disclosure, the received message may be embedded with at least one NFT, with each of the at least one NFT representing a corresponding authorization associated with the IoT device.

According to some embodiments of the present disclosure, the received message may be in the form of a plurality of layer-3 data packets, e.g., TCP/UDP data packets. According to some embodiments of the present disclosure, the at least one NFT may be embedded in a packet header of the layer-3 data packets. According to some embodiments of the present disclosure, the at least one NFT may be embedded in a preserved field of the packet header of the layer-3 data packets.

According to some embodiments of the present disclosure, the at least one NFT may be provided to the IoT device upon a registration phase of the IoT device with the IoT network. According to some embodiments of the present disclosure, the at least one NFT may be associated with a unique identifier of the IoT device. According to some embodiments of the present disclosure, for each resource authorized in the IoT network, a corresponding NFT is assigned.

According to some embodiments of the present disclosure, the authorization comprises information about the resources the IoT device is authorized to provide. According to some embodiments of the present disclosure, the IoT device may register the resources it is authorized to provide (authorized resources) during the IoT device's registration phase with the IoT network. According to some embodiments of the present disclosure, the authorized resources may be identified by corresponding resource identifiers. According to some embodiments of the present disclosure, the resource identifiers may be managed by a resource manager and be universal across the IoT network.

According to some embodiments of the present disclosure, the at least one NFT may be stored on a blockchain. According to some embodiments of the present disclosure, the blockchain may be constructed with all edge nodes and all center nodes of the IoT network. According to some embodiments of the present disclosure, the at least one NFT may be created using a device identifier of the IoT device and a resource identifier of the resource the IoT device is authorized to provide. According to some embodiments of the present disclosure, the device identifier may be assigned by the IoT network to the IoT device upon a registration phase of the IoT device. According to some embodiments of the present disclosure, the resource identifier may be managed by a resource manager and be universal across the IoT network.

According to some embodiments of the present disclosure, the device identifier of the IoT device may be registered via corresponding blockchain transaction with the blockchain. According to some embodiments of the present disclosure, the resource identifier(s) may be registered via corresponding blockchain transaction(s) with the blockchain. According to some embodiments of the present disclosure, the at least one NFT may be issued via corresponding blockchain transaction(s) to the IoT device.

According to some embodiments of the present disclosure, the received message may be signed by a TPM of the IoT device using a private key. According to some embodiments of the present disclosure, the at least one NFT may be encoded using a base64 scheme before being embedded to the message.

Then, at step 604, the authorization management process may retrieve at least one NFT, at the edge node receiving the message, from the received message. According to some embodiments of the present disclosure, the edge node receiving the message may decrypt the received message using a public key to retrieve the at least one NFT, if the received message was signed by a TPM of the IoT device.

According to some embodiments of the present disclosure, the edge node receiving the message may extract, from packet headers of layer-3 data packets, the at least one NFTs. According to some embodiments of the present disclosure, the edge node receiving the message may extract, from a preserved field of packet headers of layer-3 data packets, the at least one NFT. According to some embodiments of the present disclosure, if the at least one NFT was encoded using a base64 scheme, the edge node receiving the message may decode the extracted encoded NFT using the same base64 scheme to retrieve the at least one NFT.

The authorization management process may validate the received message, at step 606, based on the retrieved at least one NFT at the edge node receiving the message. If the validation indicates the received message conforms the corresponding authorization of the retrieved at least one NFT at step 608, the authorization management process may forward the received message, via the edge node, to a center node associated with the edge node.

According to some embodiments of the present disclosure, whether the received message conforms the corresponding authorization of the retrieved at least one NFT may be validated based on the at least one NFT using the blockchain. According to some embodiments of the present disclosure, the retrieved at least one NFT may be compared with NFTs stored on the blockchain to verify whether the retrieved at least one NFT is valid, i.e., whether the retrieved at least one NFT matches any NFT stored on the blockchain. According to some embodiments of the present disclosure, if the authorization management process determines that there are corresponding NFT(s) matches to the retrieved at least one NFT, the authorization management process may determine that the retrieved at least one NFT is valid. Responsive to the determination that the retrieved at least one NFT is valid, the authorization management process may determine the received message conforms the corresponding authorization of the retrieved at least one NFT. For each resource authorized in the IoT network, there is a corresponding NFT is created, and the authorization management process may determine that the received message conforms the corresponding authorization of the retrieved at least one NFT so long as the retrieved at least one NFT matches an NFT stored on the blockchain. This is because an NFT is created using a device identifier and a resource identifier associated with an IoT device, i.e., a valid NFT indicates that the IoT device has successfully registered the corresponding resource that the IoT device is authorized to provide (identified by the NFT, i.e., the combination of a device identifier and a resource identifier associated with the IoT device), a message with the NFT embedded can be determined to conform the corresponding authorization of the NFT.

According to some embodiments of the present disclosure, if the NFT is created using a pre-defined algorithm, the mapping between the created NFTs and authorized resources in the IoT network may be checked. If the authorization management process determines, based on the mapping, that the retrieved NFT corresponds to the resource the IoT device is authorized to provide, the authorization management process may determine that the received message conforms the corresponding authorization of the retrieved at least one NFT.

According to some embodiments in the present disclosure, if, however, the authorization management process determines that the received message does not conform the corresponding authorization of the retrieved at least one NFT, the authorization management process may discard the message at step 612. Responsive to a determination that no NFT can be retrieved from the received message, or the retrieved at least one NFT is determined to be invalid (i.e., there is no match on the blockchain), it can be determined that the received message does not conform the corresponding authorization of the retrieved at least one NFT. According to some embodiments in the present disclosure, the authorization management process may report the error (i.e., the received message does not conform the corresponding authorization of the retrieved at least one NFT) to the IoT network at step 612.

With the adoption of NFT mechanism proposed and discussed in the disclosure, a more fine-grained authorization in an IoT network can be enabled. The problem 'a hacked thermometer device may report humidity data that may lead to an unwanted action' mentioned may be solved.

The utilization of blockchain can also bring further benefits such as, for example, if a hijack occurs at an edge node, or a center node, tampered data can also be detected as all edge nodes and center nodes together construct the federated blockchain.

Embodiments of the present disclosure have been described in the above. It should be noted that the authentication management according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, at an edge node, a message from an Internet of Things (IoT) device associated with the edge node, the message embedded with a first non-fungible token (NFT), wherein:
      the IoT device is authorized to provide a plurality of different types of sensor data; and
      each type of sensor data corresponds to a different NFT of a plurality of NFTs created for the IoT device;
   retrieving, at the edge node, the first NFT from the received message;
   validating, at the edge node, the received message based on the retrieved first NFT; and
   responsive to validating the received message, forwarding, by the edge node, the received message to a center node associated with the edge node.

2. The computer-implemented method of claim 1, wherein the plurality of NFTs are stored on a blockchain.

3. The computer-implemented method of claim 1, wherein the plurality of NFTs are provided to the IoT device upon a registration phase of the IoT device.

4. The computer-implemented method of claim 1, wherein the first NFT is associated with a unique identifier of the IoT device.

5. The computer-implemented method of claim 1, wherein the corresponding authorization comprises information about a resource the IoT device is authorized to provide.

6. The computer-implemented method of claim 1, wherein:
   the message is further signed with a private key associated with the IoT device; and
   the validating the received message further comprises validating, at the edge node, the received message further based on a public key corresponding to the private key associated the IoT device.

7. A computer program product comprising:
   one or more computer readable storage media; and
   program instructions stored on the one or more computer readable storage media to perform operations comprising:
      receiving, at an edge node, a message from an Internet of Things (IoT) device associated with the edge node, the message embedded with a first non-fungible token (NFT), wherein:
         the IoT device is authorized to provide a plurality of different types of sensor data; and
         each type of sensor data corresponds to a different NFT of a plurality of NFTs created for the IoT device;
      retrieving, at the edge node, the first NFT from the received message;
      validating, at the edge node, the received message based on the retrieved first NFT; and
      responsive to validating the received message, forwarding, by the edge node, the received message to a center node associated with the edge node.

8. The computer program product of claim 7, wherein the plurality of NFTs are stored on a blockchain.

9. The computer program product of claim 7, wherein the plurality of NFTs are provided to the IoT device upon a registration phase of the IoT device.

10. The computer program product of claim 7, wherein the first NFT is associated with a unique identifier of the IoT device.

11. The computer program product of claim 7, wherein the corresponding authorization comprises information about a resource the IoT device is authorized to provide.

12. The computer program product of claim 7, wherein:
    the message is further signed with a private key associated with the IoT device; and
    the validating the received message further comprises validating, at the edge node, the received message further based on a public key corresponding to the private key associated the IoT device.

13. A computer system comprising:
    a processor set;
    one or more computer readable storage media; and
    program instructions stored on the one or more computer readable storage media to cause the processor set to perform operations comprising:
       receiving, at an edge node, a message from an Internet of Things (IoT) device associated with the edge node, the message embedded with a first non-fungible token (NFT), wherein:
          the IoT device is authorized to provide a plurality of different types of sensor data; and
          each type of sensor data corresponds to a different NFT of a plurality of NFTs created for the IoT device;
       retrieving, at the edge node, the first NFT from the received message;
       validating, at the edge node, the received message based on the retrieved first NFT; and
       responsive to validating the received message, forwarding, by the edge node, the received message to a center node associated with the edge node.

14. The computer system of claim 13, wherein the plurality of NFTs are stored on a blockchain.

15. The computer system of claim 13, wherein the plurality of NFTs are provided to the IoT device upon a registration phase of the IoT device.

16. The computer system of claim 13, wherein the first NFT is associated with a unique identifier of the IoT device.

17. The computer system of claim 13, wherein the corresponding authorization comprises information about a resource the IoT device is authorized to provide.

* * * * *